Jan. 31, 1950        A. SELSKY        2,496,070
METHOD OF MAKING FLOCK COATED ARTICLES
Filed Dec. 31, 1946        2 Sheets-Sheet 1
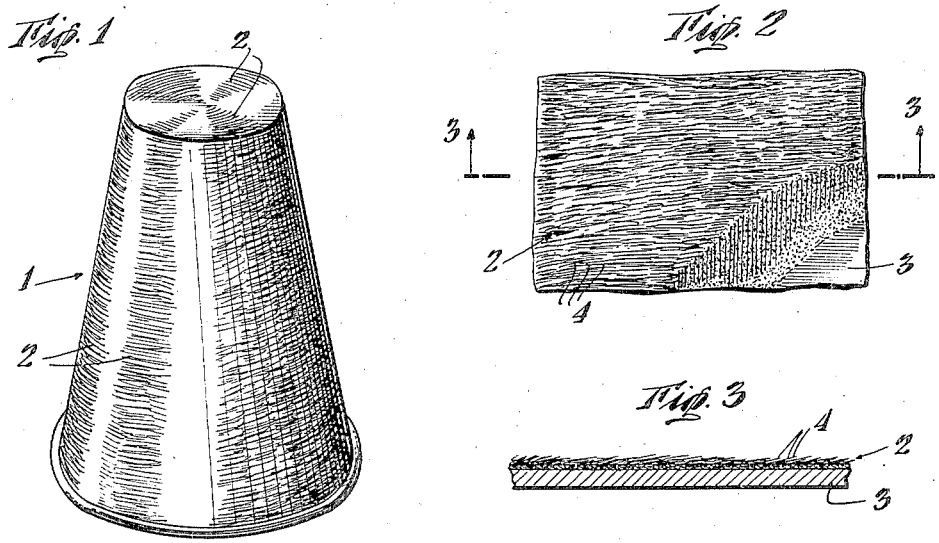
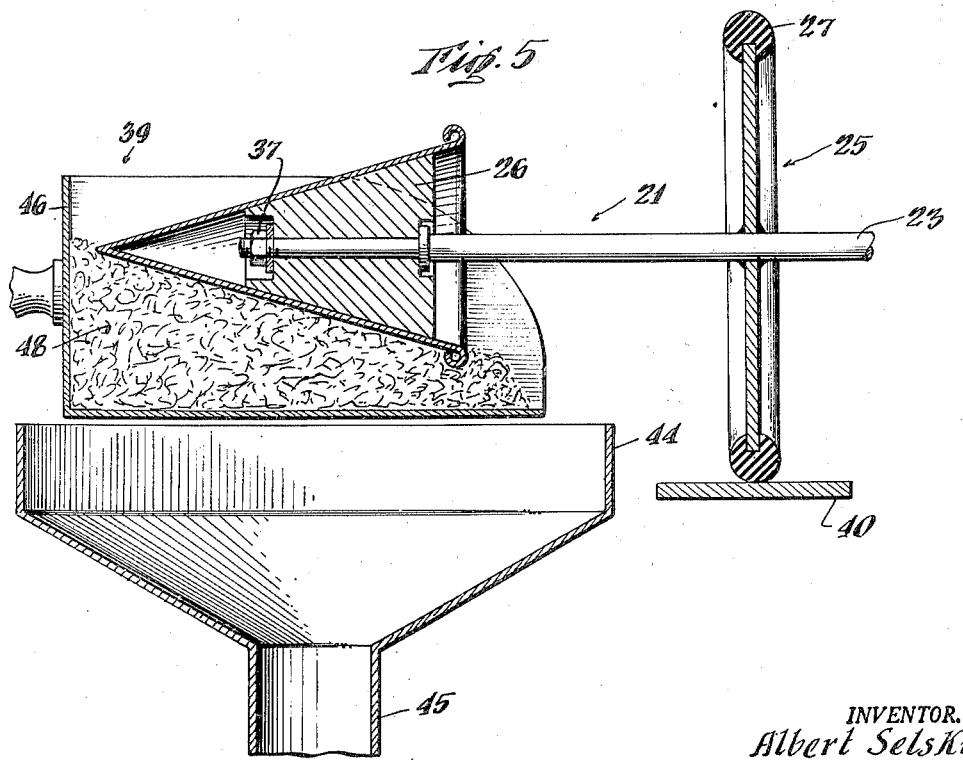
INVENTOR.
Albert Selsky
BY
Dudley W. King
ATTORNEY Jan. 31, 1950     A. SELSKY     2,496,070
METHOD OF MAKING FLOCK COATED ARTICLES
Filed Dec. 31, 1946     2 Sheets-Sheet 2
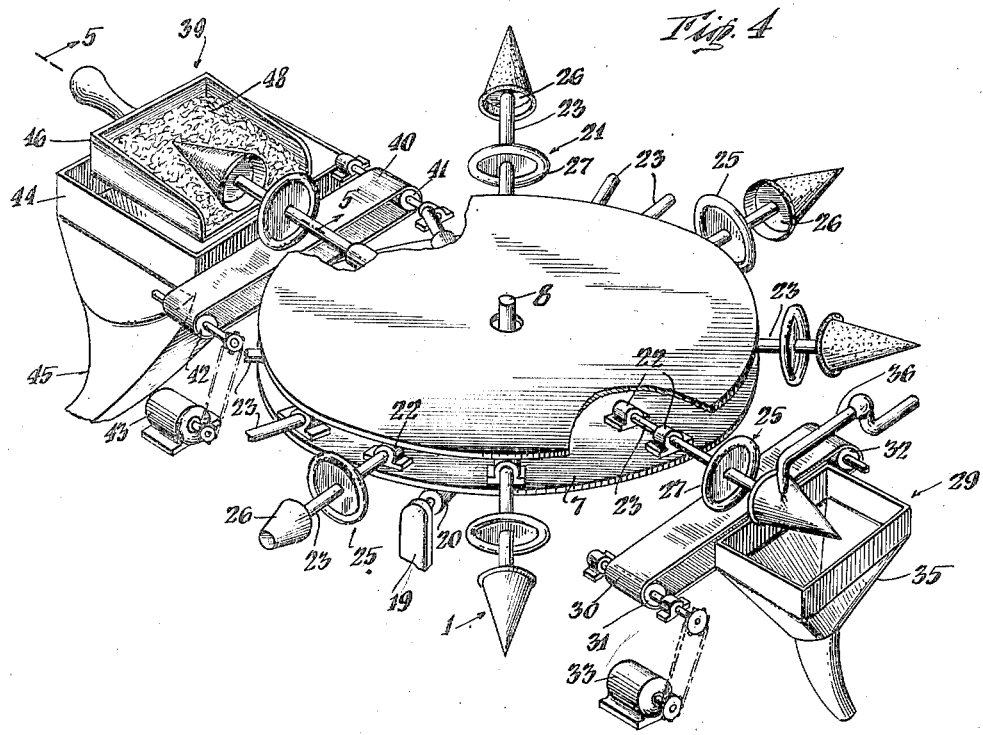
INVENTOR.
Albert Selsky
BY
Dudley W. King
ATTORNEY Patented Jan. 31, 1950

2,496,070

UNITED STATES PATENT OFFICE 2,496,070

METHOD OF MAKING FLOCK COATED ARTICLES

Albert Selsky, Brooklyn, N. Y.

Application December 31, 1946, Serial No. 719,352

3 Claims. (Cl. 117—33)

The present invention relates to the manufacture of flock coated articles having lustrous or glistening surfaces, and more particularly to a method for making such articles.

There are methods available for producing flock coated surfaces but they are relatively complicated and expensive or are open to various other objections; flocked surfaces produced generally have dull or rough finishes and the methods do not lend themselves to economical and quantity production of articles having lustrous flocked surfaces.

The present invention contemplates the provision of a method for manufacturing flock coated articles, at a relatively rapid rate, having a lustrous surface or a surface capable of exhibiting a sheen or glistening brightness, and to provide such surfaces of substantially uniform quality and appearance.

An object of the present invention is to provide a new and improved method of making flock coated articles.

Another object of the invention is to provide a new and improved method of making flock coated articles having lustrous or glistening surfaces.

Still another object of the invention is to provide a relatively simple and inexpensive method for making, on a commercial scale, articles having lustrous flock coated surfaces.

A still further object of the invention is to provide a method of making flocked articles adapted to use lesser quantities of flock material.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a perspective view showing one form of flocked article which may be made;

Fig. 2 is an enlarged fragmentary view showing a portion of the article illustrated in Fig. 1;

Fig. 3 is a sectional view along the line 3—3 of Fig. 2;

Fig. 4 is a perspective view illustrating a machine which may be used for making flock coated articles under the present method;

Fig. 5 is a sectional view taken along the line 5—5 of Fig. 4; and

Fig. 6 is a diagrammatic perspective view showing one form of drive means for the mechanism illustrated in Fig. 4.

Referring again to the drawings, and more particularly to Figs. 1, 2 and 3 thereof, there is shown an article 1 manufactured in accordance with the present method. The article is shown, for purposes of illustration, in the general shape of a frustum of a cone; articles of this general shape are useful in the manufacture of party hats, party favors, et cetera. While the invention of the present method and machine will be hereinafter described chiefly with reference to articles of conical, cylindrical or comparatively small sized flat shape, it is readily applicable to articles of other shapes and sizes.

The exterior surface of the article 1 is shown provided, according to the present method, with a coating of flock material 2, flock material generally comprising materials such as finely ground wool, finely ground felt, finely ground vegetable fibre or wool dust. Figs. 2 and 3 illustrate enlarged fragmentary views showing a portion of the flock coated article illustrated in Fig. 1. In these latter figures particularly the majority of the fibres 4 comprising a flock coating 2 appear to lie substantially in alignment along the material 3, that is, the longitudinal axes of a majority of the individual fibres appear to be so oriented or aligned as to be substantially in parallelism. A machine and method by which this alignment of the flock material may be achieved will now be described.

In Fig. 4 there is shown a table 7 mounted in any suitable manner for rotation by a vertically disposed shaft 8. The shaft 8 and table 7 may be rotated by a motor 10 (Fig. 6) through the intermediation of a pulley or wheel 11, drive belt 12, wheel 13, speed reducer and shafts 14, wheel 15, drive belt 16 and a pulley or wheel 17 keyed or otherwise secured with the shaft 8. The showing of Fig. 6 is largely diagrammatic and shows one form of drive means for turning the shaft 8 and the table or disc 7 rotated thereby. Upright members 19 (Fig. 4) having supporting rollers 20 adjacent their upper ends may be utilized to assist in maintaining the table 7 in horizontal position.

Fastened to the surface of the table at spaced intervals by bearings or brackets 22 are shown a plurality of radially extending shafts 23, each having a disc or wheel 25 intermediate its inner end and article supporting members 26 carried adjacent the outer ends of the shafts. The article supporting members 26 are shown as substantially cone shaped for purposes of illustration and are shown secured by nuts 37 adjacent the outer ends of the shafts 23. Any appropriate article supporting members may be utilized instead of the conical members 26.

The number of article supporting assemblies 21 carried by the table 7 will usually depend upon the size of the table and other desirable practical considerations; twenty cones spaced at equal intervals around the circumference of the table 7 are satisfactory. As the table 7 rotates with the central shaft 8, the article supporting assemblies revolve with the table. Preferably a cover member is provided over the upper part of the table 7 and the article supporting assemblies carried by it.

Fig. 4 shows the table 7 rotating in counter-clockwise direction so that the article supporting assemblies 21 at the front part of this figure first approach an adhesive applying station 29. Hollow articles such as the cone 3 illustrated in Fig. 4 or the frustum of a cone illustrated in Fig. 1 may be pressed or pushed over the article supporting members 26 during their revolution with the table 7 and movement toward the adhesive applying station 29.

The adhesive applying station may comprise an endless belt rotatably mounted on pulleys 31 and 32, one of the pulleys being normally rotated by an electric motor 33. As an article carrying assembly 21 of the table 7 approaches the rotating belt 30 the rim portion 27 of a wheel 25 mounted on a shaft 23 moves into contact with the belt and is set into rotation to thereby turn the shaft 23 and article supporting members 26. Continued movement of the table in counter-clockwise direction carries the article supporting assembly, with its wheel or disc 25, to a position adjacent a suction duct 35, at which position adhesive may be placed on the surface of an article by a spray gun 36 or other suitable means. Rapid rotation of an article 3 by the belt 30 and rotating wheel 25 effects even spreading or coverage of the adhesive on the surface of the article. Excess adhesive sprayed in the direction of the article 3, but which does not strike it, may be withdrawn through the duct 35 by any suitable suction blower (not shown).

From the adhesive applying station 29 the article supporting assemblies 21 continue moving with the table 7 in counterclockwise direction toward a flock applying station 39. The flock applying station comprises a belt 40 rotatably mounting on spaced pulleys or rollers 41 and 42, one of the rollers being normally driven by an electric motor 43. As a driving wheel 25 of an article carrying assembly comes into contact with and travels along the surface of the belt 40, the shaft 23 and article 3 carried adjacent the outer end thereof are rotated at a relatively rapid rate. At this flock applying station the article 3 may move over a bin or tank 44 connected with an outlet duct 45. When in desired position over the outlet duct 45 a scoop or ladle 49 containing a suitable amount or mass of flock material 48 may be moved upwardly so that the flock material 48 contacts the adhesively coated surface of the article 3. During movement from the adhesive applying station 29 to the flock applying station 39 the adhesive applied at the former station has preferably become partially dried so that it is no longer in completely liquid state and so that it has not completely dried. The adhesive material on the surface of an article 3 as it approaches the flock applying station 39 is thus preferably in what may be termed a "tacky" condition. Flock material applied against the tacky surface of an article 3 at the station 39 is so deposited on the surface of the article 3 as to form a coating exhibiting a lustrousness, gleaming brightness, or shine not present in ordinary flocked articles.

While any suitable speeds may be utilized for movement of the table 7, movement of belt 30 at the adhesive applying station 29 and movement of belt 40 at the flock applying station 39, it is suitable in normal operation to rotate the table 7 about once every forty-five seconds so that approximately twenty-two and one-half seconds intervenes during movement of an article 3 from the adhesive applying station 29 to the flock applying station 39. With this drying period and the "coasting" rotation of an article 3 on a supporting assembly 21, the adhesive coating acquires a sufficiently tacky condition as to cooperate with the fibres of flock material 48 and form a most desirable lustrous coating.

It is generally satisfactory to rotate the motor 33 and belt 30 of the adhesive applying station 29 at such speed as to turn a wheel 25 of an article supporting assembly at approximately five hundred revolutions per minute and to drive the motor 43 and belt 40 of the flock applying station 39 at a speed sufficient to rotate a wheel 25 and article 3 at this latter station at a speed of approximately eight hundred to one thousand revolutions per minute. Any suitable suction fan or blower may be connected with the outlet duct 45 of the bin 44 to withdraw particles of flock material for reclamation and re-use.

After leaving the flock applying station 39, articles 3 may be removed manually or in any other suitable manner from the supporting members 26 and additional unflocked articles pressed thereon. Articles removed subsequent to passing the flocking station 39 result in minimum soiling of the hands with adhesive as the adhesive is covered by flock material and is sufficiently dry at this location.

The flock material may be obtained in various different colors and it is preferably to utilize an appropriately colored adhesive with a particular color of flock. For example, a yellowish flock paint or flocking adhesive is preferably utilized with yellowish flock; red flock paint with red flock, et cetera.

Where flock material is moved against the partially dried adhesive coating of an article 3 at the flocking station 39, the flock is "picked up" and aligned, oriented, or "brushed out" so as to provide a flocked article having what may be termed a lustrous, shiny, glistening, or sheen-like surface.

While not certain of the exact theory, it is believed that the partially dried or tacky adhesive coating which reaches the flock applying station picks up or pulls individual fibres of flock material from a body or mass 48 of flock material. The rapid movement, rotation, or revolution of the article, simultaneous with its contacting the flock material seems to cause substantial alignment of a majority of the individual flock fibres so that small or minute reflecting surfaces of individual flock fibres effectively combine to reflect light which strikes a flocked surface made up of an infinite number of individual flock fibres.

A very desirable feature of the present machine and method is that a lesser quantity of flock is required to provide a flock coated article than is generally true of previous machines and methods.

In some instances the saving in flock material incurred by practicing the present invention has run in the neighborhood of about one-third less for coating an article than the quantity required where flock material is applied in accordance with ordinary commercial practice.

In some instances it is desirable to manufacture multicolored articles. This may be done, for example, by applying adhesive up to only a certain height on an article 3, thereafter applying flock material in the manner described at the flock applying station 39, subsequently applying adhesive to the uncoated portion of the article 3, and thereafter applying a different color flock material to the article as it reaches the flock applying station 39 on its second passage around with the table 7. For example, the lower portion of an article could be provided with a bluish adhesive and flock material and the upper portion could be provided with a yellowish adhesive and flock material.

While a lustrous surface could be provided on an article by covering it with tinfoil or other highly reflecting particles, the present method of providing such a surface is preferred and believed more feasible as it is less expensive.

It will be seen that the present invention provides a new and improved method for applying flocking coatings to articles. The surface provided by practicing the invention is one of enhanced beauty by reason of the lustrous or glistening brightness of the surface. Articles provided with flock coatings according to the present method achieve a considerable saving in cost due to the lesser quantities of flock materials required. The present method is relatively simple and inexpensive and are well adapted to the production of flock coated articles on a commercial scale.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of forming a lustrous coated finish on the outer surface of an article which comprises providing a tacky adhesive on the area of said article to be coated, supporting said article on a rotatable member, contacting the article with a mass of flock, and rotating said member and said article at a relatively rapid rate while in said contact whereby flock is picked up and the majority thereof is oriented and substantially aligned and retained in said orientation and alignment on said surface.

2. The method of forming a lustrous coated finish on the outer surface of an article which comprises providing a tacky adhesive on the area of said article to be coated, supporting said article on a rotatable member, contacting the article with a mass of flock, and rotating said member and said article at substantially from eight hundred to one thousand revolutions per minute while in said contact whereby flock is picked up and the majority thereof is oriented and substantially aligned and retained in said orientation and alignment on said surface.

3. The method of forming a lustrous coated finish on the outer surface of an article which comprises applying a liquid adhesive on the area of said article to be coated, partially drying said adhesive to a tacky condition, supporting said article on a rotatable member, contacting the article with a mass of flock, and rotating said member and said article at a relatively rapid rate while in said contact whereby flock is picked up and the majority thereof is oriented and substantially aligned and retained in said orientation and alignment on said surface.

ALBERT SELSKY.

REFERENCES CITED

The following references are of record in the file of this patent:

UNITED STATES PATENTS

| Number | Name | Date |
|---|---|---|
| Re. 16,047 | Miller | Apr. 21, 1925 |
| 35,855 | Greene | July 8, 1862 |
| 2,014,426 | Dorogi | Sept. 17, 1935 |
| 2,076,451 | Fallscheer | Apr. 6, 1937 |
| 2,203,752 | Smith | June 11, 1940 |
| 2,338,499 | Faris | Jan. 4, 1944 |
| 2,389,657 | Faris | Nov. 27, 1945 |